United States Patent
Liu et al.

(10) Patent No.: US 8,774,115 B2
(45) Date of Patent: Jul. 8, 2014

(54) METHOD AND SYSTEM FOR DATA TRANSMISSION IN COMMUNICATION SYSTEM

(75) Inventors: Lin Liu, Shenzhen (CN); Xiang Cheng, Shenzhen (CN); Yazhu Ke, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 58 days.

(21) Appl. No.: 13/497,294

(22) PCT Filed: Aug. 31, 2010

(86) PCT No.: PCT/CN2010/076503
§ 371 (c)(1),
(2), (4) Date: Mar. 21, 2012

(87) PCT Pub. No.: WO2011/095002
PCT Pub. Date: Aug. 11, 2011

(65) Prior Publication Data
US 2012/0287873 A1     Nov. 15, 2012

(30) Foreign Application Priority Data
Feb. 5, 2010   (CN) .......................... 2010 1 0121146

(51) Int. Cl.
*H04W 72/04*    (2009.01)
*H04W 76/02*    (2009.01)
*H04W 4/00*     (2009.01)

(52) U.S. Cl.
CPC .............. *H04W 76/02* (2013.01); *H04W 72/04* (2013.01); *H04W 4/005* (2013.01)
USPC .......................................... 370/329; 370/431

(58) Field of Classification Search
CPC ..... H04W 76/02; H04W 76/04; H04W 72/04; H04W 4/005
USPC .............. 370/329, 252, 395.2, 431, 457, 468
See application file for complete search history.

(56) References Cited

U.S. PATENT DOCUMENTS 7,145,895 B2 *  12/2006  Mueckenheim et al. ..... 370/348
2004/0110521 A1   6/2004  Soldani et al.
(Continued)

FOREIGN PATENT DOCUMENTS

| CN | 101232433 A | 7/2008 |
|---|---|---|
| CN | 101500318 A | 8/2009 |

(Continued)

OTHER PUBLICATIONS

International Search Report for PCT/CN2010/076503 dated Nov. 15, 2010.

*Primary Examiner* — Brian D Nguyen
(74) *Attorney, Agent, or Firm* — Banner & Witcoff, Ltd.

(57) ABSTRACT

A method for data transmission in a communication system is disclosed in the present invention. The method includes: after the radio access network and the core network finish the initialization, the core network initiates a public bearer establishment or the radio access network requests to establish the public bearer, and the radio access network and the core network establish the public bearer there between; and the radio access network and the core network transmit uplink data and/or downlink data of multiple machine type communication (MTC) equipment by using the public bearer. A system for data transmission in a communication system is also disclosed in the present invention.

7 Claims, 4 Drawing Sheets

(56) References Cited

U.S. PATENT DOCUMENTS

| | | |
|---|---|---|
| 2004/0125748 A1 | 7/2004 | Hurtta et al. |
| 2004/0203640 A1* | 10/2004 | Molander et al. ........... 455/414.1 |
| 2009/0176495 A1 | 7/2009 | Beming et al. |
| 2009/0252132 A1* | 10/2009 | Song et al. ..................... 370/338 |
| 2009/0262704 A1* | 10/2009 | Khetawat et al. .............. 370/331 |
| 2010/0067697 A1* | 3/2010 | Casati et al. .................. 380/270 |
| 2010/0103863 A1* | 4/2010 | Ulupinar et al. .............. 370/315 |
| 2010/0135194 A1* | 6/2010 | Kubota ...................... 370/310.1 |
| 2010/0136987 A1* | 6/2010 | Kim et al. ..................... 455/450 |
| 2010/0172239 A1* | 7/2010 | Corliano et al. ............... 370/230 |
| 2011/0116469 A1* | 5/2011 | Bi et al. ......................... 370/331 |

FOREIGN PATENT DOCUMENTS

| | | |
|---|---|---|
| WO | 0070831 A1 | 11/2000 |
| WO | 2004043021 A1 | 5/2004 |
| WO | 2004064422 A1 | 7/2004 |
| WO | 2005096655 A1 | 10/2005 |
| WO | 2006065446 A2 | 6/2006 |
| WO | 2006120289 A2 | 11/2006 |

* cited by examiner

METHOD AND SYSTEM FOR DATA TRANSMISSION IN COMMUNICATION SYSTEM

TECHNICAL FIELD

The present invention relates to the field of mobile communication, and in particular, to a method and system for data transmission of a machine type communication (MTC) equipment.

BACKGROUND OF THE RELATED ART

The Machine to Machine (M2M) is defined in the narrow sense to be the machine to machine communication. The definition in the broad sense is the networked application and service which take the intelligent interaction of the machine terminal as the core. The M2M is based on the intelligent machine terminal, regards a plurality of communication modes as the access method and provides the information solution to the customer, to satisfy the information demand of the customer at the respects, such as monitoring, commanding and dispatching, data acquisition and measuring, etc.

The development of wireless technology is the important factor of the development of the M2M market. The wireless technology breaks through the space-time restriction and the region obstacle for the traditional communication mode, makes the enterprise and the public get rid of the cable fetter, lets the customer control the cost more effectively, reduces the mounting cost and is used simply and conveniently. In addition, the demand increased day by day is promoting the M2M to develop forward constantly. The contradiction with the increasing of the information processing capacity and the network bandwidth constantly is that the information acquisition means is far backward. While the M2M well satisfies this demand of people, through which people can monitor the external environment in real time, to realize large range and automatic information acquisition. Therefore, the M2M can be applied to the industry application, family application and personal application, etc. The industry application includes: traffic monitoring, alarm system, offshore rescuing, dispenser and paying when driving etc. The family application includes: automatic meter reading and temperature control, etc. Personal application includes: life detection and remote diagnoses etc.

Figure 1:
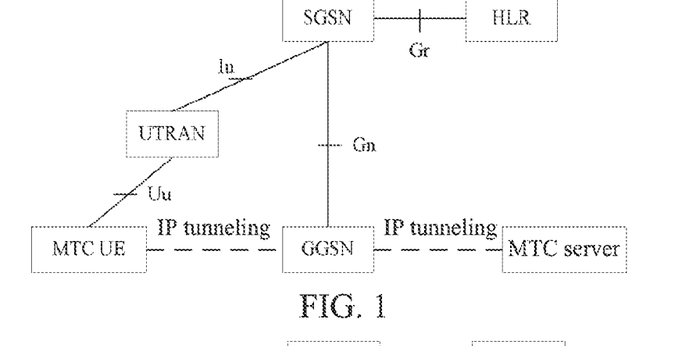
FIG. 1 is a schematic diagram of MTC UE accessing a radio core network through a UTRAN in the related art.
Figure 2:
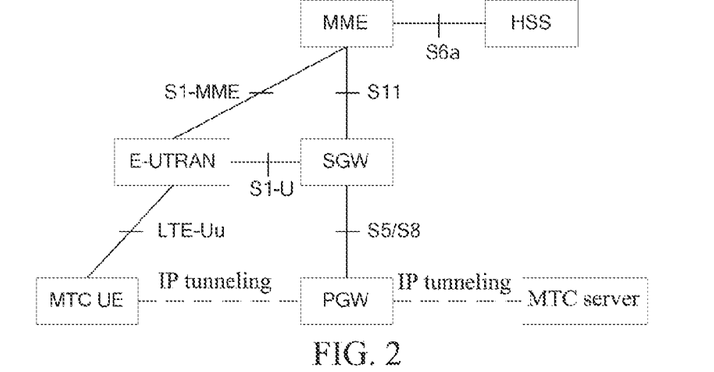
FIG. 2 is a schematic diagram of MTC UE accessing an evolved packet core network (EPC) system through an E-UTRAN in the related art.

The communication object of the M2M is machine to machine or people to machine. The data communication between one or more machines is defined as machine type communication (MTC), and in this case, man-machine interaction is seldom needed. The machine participating in the MTC is defined as the MTC equipment. The MTC equipment is the terminal of the MTC user, which can communicate with the MTC equipment and the MTC server through the public land mobile network (PLMN). The user equipment (UE) is the additional function block of the MTC equipment, and that function block is used for making the MTC equipment access the mobile communication system. The MTC server manages and monitors the MTC equipment. FIGS. 1 and 2 are the diagrams of the MTC UE accessing the core network (CN) through the universal terrestrial radio access network (UTRAN), and the evolved UTRAN (E-UTRAN) in the prior art respectively.

Since the MTC equipment is mostly specific application equipment, for example, the automatic meter reading and life detection use different equipments, etc. The MTC equipments of different applications have different characteristics, for example, the elevator equipment such as the lift has attributes such as low mobility, packet switch only (PS only), and etc. While the monitoring and alarm equipment, except for having low mobility and the PS only characteristics, further has the attributes, such as low data transmission and high usability. Therefore performing different system optimizations to the MTC equipments of different applications can efficiently perform management, controlling and paying, etc., to the MTC equipment.

The communication between the MTC equipment and the network also has the following obvious features:
- there are many communicating equipments: data acquisition is usually used for the application in a certain service industry, and many machinery equipments are involved, such as the ammeter data statistics of each household in the whole urban;
- the flow rate of the data is low: the machinery equipment usually transmits data only when needing to acquire the information, the flow rate of the data is low, and the data packet is small and does not need to be transmitted continuously;
- the real time requirement is low: generally the time requirement of the data acquisition is not high, which can be finished during a relative long time period.

The present wireless communication system, such as the universal mobile telecommunications system (UMTS) and the long term evolution (LTE) system, performs the data transmission through setting a dedicated bearer for each user. Since the MTC equipment communication system has the obvious features, such as, numerous equipments and little data bulk, setting dedicated bearer for each data transmission of each user will increase a large number of control plane signaling used for bearer setting and deleting, and the efficiency of the dedicated bearer used for the data transmission is also very low.

SUMMARY OF THE INVENTION

The technical problem to be solved by the present invention is to provide a method and system for data transmission in a communication system, which can improve the efficiency of data transmission and reduce a large number of control plane signaling.

In order to solve the above mentioned technical problem, the present invention provides a method for data transmission in a communication system, comprising:

after a radio access network and a core network finish the initialization, the core network initiating a public bearer establishment or the radio access network requesting to establish a public bearer, and the radio access network and the core network establishing the public bearer there between; and the radio access network and the core network transmitting uplink data and/or downlink data of multiple machine type communication (MTC) equipment by using the public bearer.

The step of transmitting uplink data of a plurality of MTC equipment by utilizing the public bearer comprises:

when the MTC equipment requests to perform an uplink data transmission, the radio access network judging whether the uplink data required to be transmitted by the MTC equipment meet a predetermined condition: for the data meeting the predetermined condition, an already established public bearer is used to perform the data transmission; for the data not meeting the predetermined condition, a dedicated data bearer is established to perform the uplink data transmission for the MTC equipment.

The step of the core network initiating a public bearer establishment or the radio access network requesting to establish a public bearer and the radio access network and the core network establishing the public bearer there between comprises:

the radio access network transmitting a bearer establishment request to the core network, the core network, after receiving the bearer establishment request, transmitting a bearer establishment message to the radio access network; or the core network transmitting the bearer establishment message to the radio access network voluntarily; wherein, the bearer establishment message carries a service quality parameter, transport layer information and general packet radio service (GPRS) tunneling protocol tunnel end point identifier (GTP TEID) corresponding to the bearer required to be established; and the radio access network, according to the content carried in the bearer establishment message, establishing the public bearer with the core network.

In the step of the radio access network transmitting the bearer establishment request to the core network, the radio access network transmits bearer establishment request message to the core network after receiving the uplink data transmitted by the MTC equipment.

The bearer establishment message further carries the number of the bearers required to be established, to indicate establishing a plurality of public bearers.

The method further comprises:

the core network determining that one or more public bearers meet a releasing condition, and initiating the bearer releasing; or the radio access network determining that one or more public bearers satisfy the releasing condition, transmitting a bearer releasing request to the core network, and the core network initiating the bearer releasing after receiving the request and confirming that the public bearer needs to be released.

In order to solve the above mentioned technical problem, the present invention further provides a system for data transmission in a communication system, comprising radio access network equipment and core network equipment, wherein, the core network equipment is configured to, after finishing initialization, transmit a bearer establishment message to the radio access network equipment, indicate the radio access network equipment to establish a public bearer with the core network equipment, and after the public bearer is established completely, transmit downlink data of machine type communication (MTC) equipment by using the public bearer;

the radio access network equipment is configured to, after finishing initialization, establish the public bearer with the core network equipment after receiving the public bearer establishment transmitted by the core network equipment, and after the public bearer is established completely, transmit uplink data of a plurality of MTC equipments by using the public bearer.

The radio access network equipment is configured to transmit the uplink data of the plurality of MTC equipments by using the public bearer according to the following way: when the MTC equipment requests to perform an uplink data transmission, judging whether the data required to be transmitted by the MTC equipment meet a predetermined condition; for the data meeting the predetermined condition, the already established public bearer is used to perform the data transmission; and for the data not meeting the predetermined condition, a dedicated data bearer is established to perform the uplink data transmission for that MTC equipment.

In order to solve the above mentioned technical problem, the present invention further provides a system for data transmission in a communication system, comprising radio access network equipment and core network equipment, wherein, the radio access network equipment is configured to, after finishing initialization, transmit a bearer establishment request to the core network equipment, request to establish a public bearer with the core network equipment, and establish the public bearer with the core network equipment after receiving a bearer establishment message transmitted by the core network, and after the public bearer is established completely, transmit uplink data of a plurality of machine type communication (MTC) equipments by using the public bearer; and the core network equipment is configured to, after finishing initialization, transmit the bearer establishment message to the radio access network equipment after receiving the bearer establishment request transmitted by the radio access network equipment, indicate the radio access network equipment to establish the public bearer with the core network equipment, and after the public bearer is established completely, transmit downlink data of the MTC equipment by using the public bearer.

The radio access network equipment is configured to transmit the uplink data of the plurality of MTC equipments by using the public bearer according to the following way: when the MTC equipment requests to perform an uplink data transmission, judging whether the data required to be transmitted by the MTC equipment meet a predetermined condition; for the data meeting the predetermined condition, the already established public bearer is used to perform the data transmission; and for the data not meeting the predetermined condition, a dedicated data bearer is established to perform the uplink data transmission for the MTC equipment.

By adopting the method and system described in the present invention, there is no necessary to establish a dedicated data bearer for each data transmission of each MTC equipment, since the user data of all the MTC equipments are transmitted by the public bearer established between the radio access network and the core network, and thus the control plane signaling for bearer control can be reduced, and the efficiency of data transmission is improved.

PREFERRED EMBODIMENTS OF THE PRESENT INVENTION

The invention conception of the present invention is that: after a radio access network and a core network finish the initialization, the core network initiates a public bearer establishment or the radio access network requests to establish a public bearer, and the radio access network and the core network, after establishing the public bearer there between, transmit uplink data and/or downlink data of multiple MTC UE by using the public bearer.

The radio access network and the core network can establish the public bearer after powering up and finishing the initialization, or establish the public bearer after restarting and finishing the initialization.

When the MTC UE requests to perform the uplink data transmission, the radio access network judges the data required to be transmitted by the MTC UE; for the data meeting the predetermined condition, the already established public bearer is used to perform the data transmission; otherwise a dedicated data bearer is established to perform the uplink data transmission for that MTC UE.

The predetermined condition can be a data attribute condition, such as, a data amount condition or a data type condition, etc., for example, the radio access network determines whether to adopt the public bearer to perform the data transmission according to the data amount of the data required to be transmitted; if the data amount is relatively large, that is, the data amount exceeds the predetermined threshold, then a dedicated data bearer is established for the MTC UE; if the data amount is relatively small, that is, the data amount is lower than the predetermined threshold, then an already established public bearer is used to perform the data transmission directly. The specific process refers to the procedure shown in FIG. 3, including the following steps.

Figure 3:
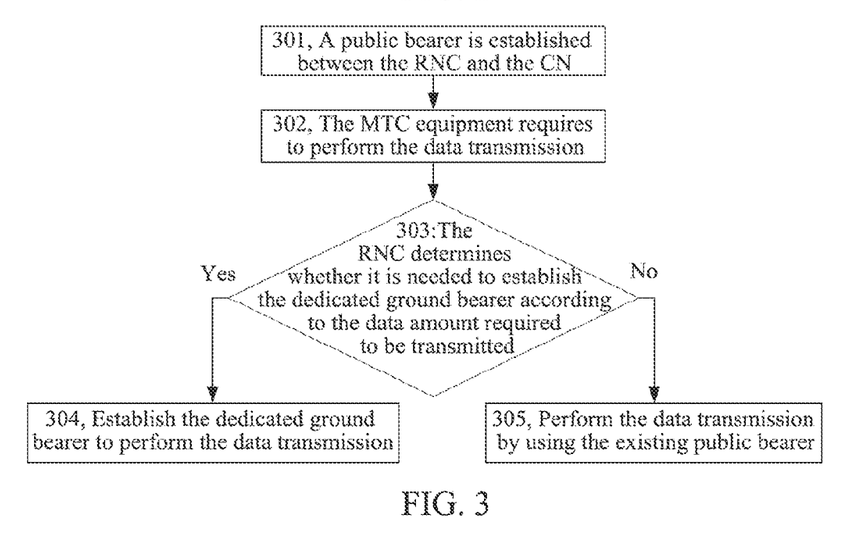
FIG. 3 is a flow chart of a RNC judging according to data amount of MTC UE.

In step 301, a public bearer is established between the radio network controller (RNC) and the core network (CN.

The public bearer of this text refers to the bearer used by a plurality of MTC UEs together, while not directs at a bearer of a certain MTC UE.

In step 302, the MTC UE transmits the data transmission request and requests to perform the data transmission.

In step 303, the RNC judges whether it is needed to establish the dedicated ground bearer according to the data amount of the data required to be transmitted by the UE and forwarded through the base station (Node B, NB); if yes, step 304 is executed; if no, step 305 is executed.

In step 304, the RNC establishes the dedicated ground bearer to perform the data transmission.

The process of establishing the dedicated ground bearer can be performed by adopting the specified procedure in the existing standard, which is not a focal point of the present invention and will not go into details.

In step 305, the RNC performs the data transmission by using the already established public bearer.

However it does not exclude the case that the radio access network uses that public bearer to perform the data transmission for the data of all MTC UEs, and at this moment the above-mentioned predetermined condition can be set as null.

After establishing the dedicated data bearer and performing the uplink data transmission for a certain MTC UE, if the downlink data of that UE meeting the above-mentioned predetermined condition, the public bearer can also be adopted to perform the downlink transmission.

The technical scheme of the present invention is further described in detail with reference to the accompanying drawings and in combination with examples hereinafter, to ensure those skilled in the art can understand and implement the present invention very well, but the described examples are not intended to limit the present invention.

Example ONE

Figure 4:
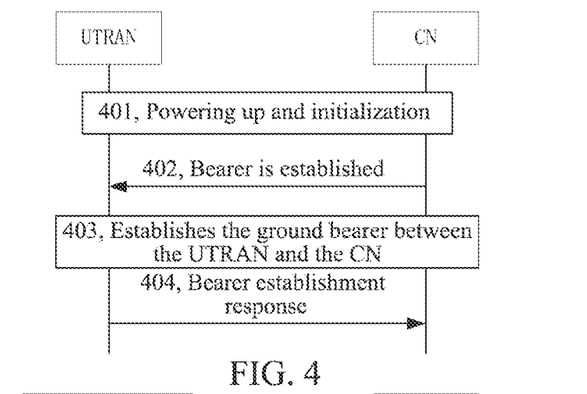
FIG. 4 is a flow chart of MTC UE accessing through a UTRAN system and the establishment of a public bearer between a RNC and a CN according to example one of the present invention.

FIG. 4 is a flow of MTC UE accessing through a UTRAN system and the establishment of a public bearer between a RNC and a CN, which specifically includes the following steps.

In step 401, the UTRAN and the CN are powered up respectively and finish the initialization process.

In step 402, after the initialization process is finished, the CN transmits a bearer establishment message to the UTRAN and requests the UTRAN to establish the ground bearer with the CN; and the bearer establishment message needs to carry the quality of service (QoS) parameter, the transport layer information (such as, the address of the transport layer), the GPRS tunneling protocol tunnel end point identifier (GTP TEID) of the bearer required to be established, etc.

The ground bearer established between the UTRAN and the CN may be one or more. If multiple ground bearers are established, the bearer establishment message needs to carry the number of the bears to be established.

The present step can be triggered after the CN finishes the initialization process, and also can be triggered when the CN needs to transmit the related downlink data at the first time.

In step 403, the UTRAN, after receiving the bearer establishment message transmitted by the CN, establishes the ground bearer with the CN according to the information carried therein, such as the number of the bearers required to be established and the QoS parameter, the transport layer address and the GTP TEID, etc.

The above-mentioned ground bearer is not established for once data transmission of a user, while it is the public bearer which can be used to perform the data transmission for all MTC equipment.

In step 404, after the bearer is established completely, the UTRAN returns a bearer establishment completion message to the CN.

If multiple bearers are established at the same time, it should be pointed out which bearers are established successfully and which bearers are established unsuccessfully in the bearer establishment completion message.

When the MTC equipment needs to perform the data transmission, the RNC determines whether it needs to establish the dedicated ground bearer according to the data amount required to be transmitted. For the service with greater data amount, the dedicated ground bearer is established for the user; for the service with smaller data amount, it does not need to establish the dedicated ground bearer and uses the existing public bearer to perform the data transmission.

Example TWO

Figure 5:
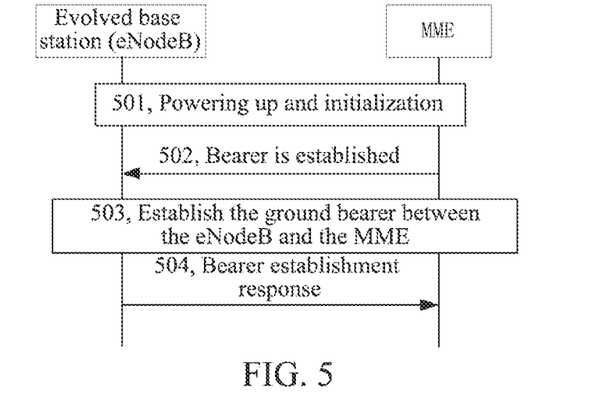
FIG. 5 is a flow chart of MTC UE accessing through an E-UTRAN system and the establishment of a public bearer between an eNodeB and an MME according to example two of the present invention.

FIG. 5 is a flow of MTC UE accessing through an E-UTRAN system and the establishment of a public bearer between an evolved base station (evolved Node B, eNodeB) in the E-UTRAN system and an MME in the core network, which is similar with the above procedure and includes the following steps.

In step 501, the eNodeB and the MME are powered up respectively and finish the initialization process.

In step 502, the MME initiates the bearer establishment to the eNodeB and requests the eNodeB to establish the ground bearer with the MME (the ground bearer established in the present embodiment is the public bearer).

The MME carries the QoS parameter, the transport layer information (such as the address of the transport layer), the GTP TEID of the bearer required to be established and the number of the bearers to be established (optional) in the bearer establishment message.

In step 503, the eNodeB, after receiving the bearer establishment message transmitted by the MME, establishes the public bearer with the MME according to the information carried therein.

In step 504, the eNodeB returns the bearer establishment completion message to the MME.

The MME and the eNodeB transmit the uplink and downlink data of the MTC UE by using the established public bearer, and after the data transmission is finished, the ground bearer of the S1 interface will not be released.

Example THREE

Figure 6:
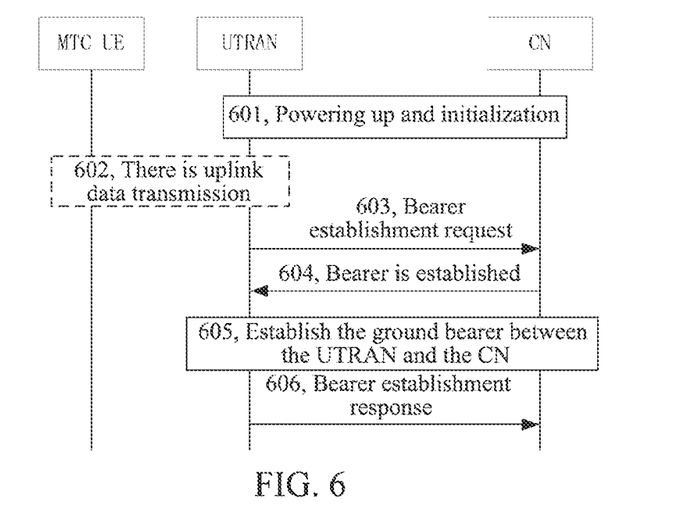
FIG. 6 is a flow chart of a RNC requesting to establish a public bearer according to example three of the present invention.

FIG. 6 is a flow of MTC UE accessing through a UTRAN system and a RNC in the UTRAN system initiating a bearer establishment, which specifically includes the following steps.

In step 601, the UTRAN and the CN are powered up respectively and finish the initialization process.

In step 602, the MTC equipment initiates the uplink data transmission and transmits the data to be transmitted to the UTRAN.

In step 603, the UTRAN transmits the bearer establishment request message to the CN and requests to establish the public bearer used for the data transmission.

In other examples, the UTRAN can initiate the bearer establishment to the CN directly in step 601, that is, after the initialization is finished.

In step 604, the CN initiates the bearer establishment message according to the request of the UTRAN and commands the UTRAN to establish the corresponding public bearer.

In step 605, the UTRAN, after receiving the bearer establishment message transmitted by the CN, establishes the public bearer with the CN according to the information carried in the message, such as the number of the bearers required to be established and the QoS parameter, the transport layer address and the GTP TEID, etc.

In step 606, after the bearer is established completely, the UTRAN returns the bearer establishment completion message to the CN.

The UTRAN and the CN transmit the uplink and downlink data of the MTC UE by using the established public bearer. And after the data transmission is finished, the ground bearer of the Iu interface will not be released.

Example FOUR

Figure 7:
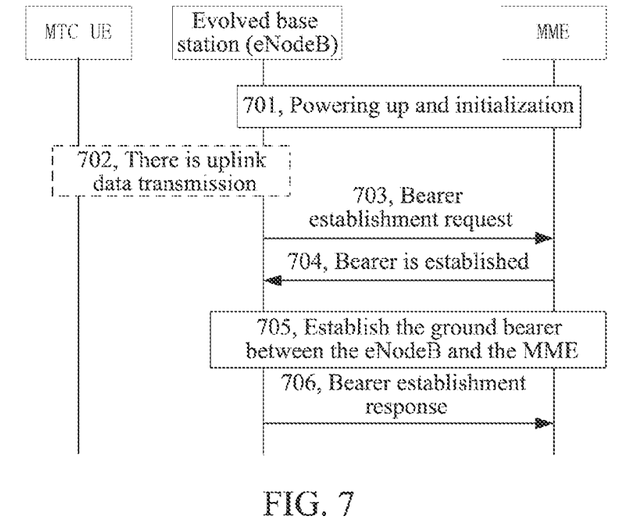
FIG. 7 is a flow chart of an eNodeB requesting to establish a public bearer according to example four of the present invention.

FIG. 7 is a flow of MTC UE accessing through an E-UTRAN system and an eNodeB in the E-UTRAN system initiating a bearer establishment request, which is similar with the above mentioned procedure and includes the following steps.

In step 701, the E-UTRAN and the MME are powered up respectively and finish the initialization process.

In step 702, (the present step is optional) the MTC equipment initiates the uplink data transmission and transmits the data to be transmitted to the E-UTRAN.

In step 703, the E-UTRAN transmits the bearer establishment request message to the MME and requests to establish the public bearer used for the data transmission.

In step 704, the MME initiates the bearer establishment message according to the request of the E-UTRAN and commands the E-UTRAN to establish the corresponding public bearer.

In step 705, the E-UTRAN, after receiving the bearer establishment message transmitted by the MME, establishes the public bearer with the MME according to the information carried therein.

In step 706, after the bearer is established completely, the E-UTRAN returns the bearer establishment completion message to the MME.

The E-UTRAN and the MME transmit the uplink and downlink data of the MTC UE by using the established public bearer. And after the data transmission is finished, the ground bearer of the S1 interface will not be released.

Example FIVE

Figure 8:
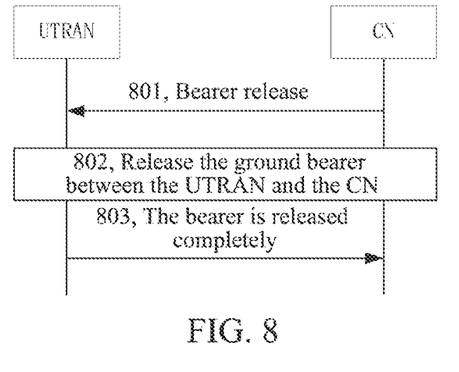
FIG. 8 is a flow chart of a CN initiating public bearer release according to example five of the present invention.

FIG. 8 is a flow of MTC UE accessing through a UTRAN system and a CN initiating public bearer release, which specifically includes the following steps.

In step 801, the CN judges whether a certain public bearer between the CN and the UTRAN meets the release condition; if yes, a bearer release message is transmitted to the UTRAN.

The release condition, for example, can be whether an aging time of the public bearer is reached, or whether the public bearer fails, or the bit error rate of the public bearer reaches the predetermined threshold, etc.

If a plurality of public bearers are established, and the plurality of public bearers meet the release condition at the same time, then the plurality of the public bearers can be released at the same time.

In step 802, the UTRAN, after receiving the bearer release message of the CN, executes the release operation to release the public bearer between the UTRAN and the CN.

In step 803, after the bearer is released completely, the UTRAN returns the bearer release completion message to the CN.

Example SIX

Figure 9:
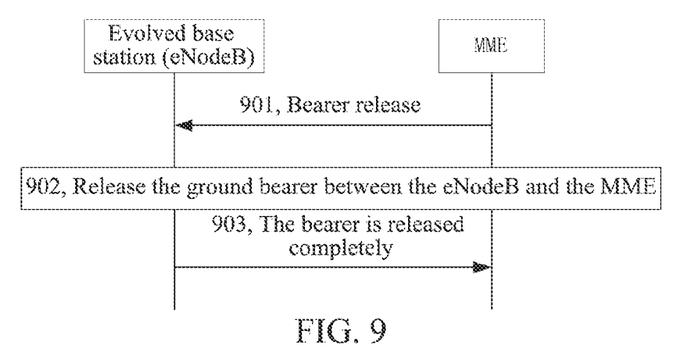
FIG. 9 is a flow chart of an MME initiating public bearer release according to example six of the present invention.

FIG. 9 is a flow of MTC UE accessing through an E-UTRAN system and an MME initiating public bearer release, which is similar with the above procedure and includes the following steps.

In step 901, the MME judges whether a certain public bearer between the MME and the eNodeB meets the release condition; if yes, a bearer release message is transmitted to the eNodeB.

In step 902, the eNodeB, after receiving the bearer release message of the MME, executes the release operation to release the public bearer between the eNodeB and the MME.

In step 903, after the bearer is released completely, the eNodeB returns the bearer release completion message to the MME.

Example SEVEN

Figure 10:
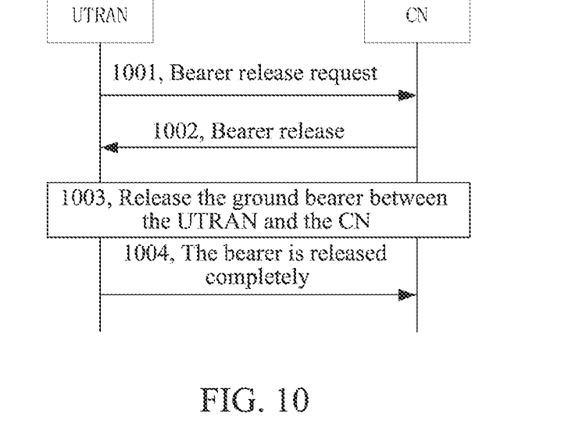
FIG. 10 is a flow chart of a RNC requesting to release a public bearer according to example seven of the present invention.

FIG. 10 is a flow of MTC UE accessing through a UTRAN system and a RNC initiating a public bearer release request, which specifically includes the following steps.

In step 1001, the UTRAN judges whether a certain public bearer between the UTRAN and the CN meets the release condition; if yes, a bearer release request message is transmitted to the CN.

In step 1002, the CN, after receiving the request, determines whether it is needed to release the public bearer, that is, judges whether the public bearer meets the release condition; if yes, a bearer release message is transmitted to the UTRAN.

In step 1003, the UTRAN, after receiving the release message of the CN, executes the release operation to release the public bearer with the CN.

In step 1004, after the bearer is released completely, the UTRAN returns the bearer release completion message to the CN.

Example EIGHT

Figure 11:
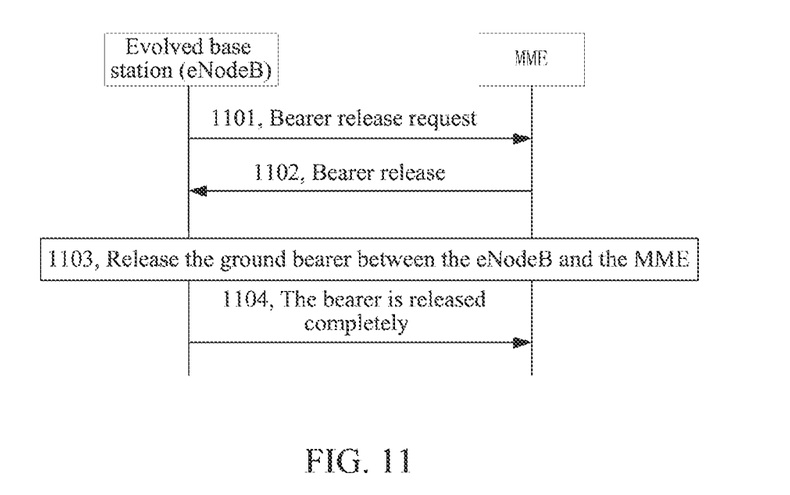
FIG. 11 is a flow chart of an eNodeB requesting to release a public bearer according to example eight of the present invention.

FIG. 11 is a flow of MTC UE accessing through an E-UTRAN system and an eNodeB initiating a public bearer release request, which is similar with the above mentioned procedure and includes the following steps.

In step 1101, the E-UTRAN judges whether a certain public bearer between the E-UTRAN and the MME meets the release condition; if yes, a bearer release request message is transmitted to the MME.

In step 1102, the MME, after receiving the request, determines whether it is needed to release the public bearer, that is, judges whether the public bearer meets the release condition; if yes, a bearer release message is initiated to the E-UTRAN.

In step 1103, the E-UTRAN, after receiving the release message of the MME, executes the release operation to release the public bearer with the MME.

In step 1104, after the bearer is released completely, the E-UTRAN returns the bearer release completion message to the MME.

The system for implementing the data transmission in the above mentioned example 1 and example 2 comprises a radio access network and a core network, wherein, the core network is configured to, after finishing initialization, transmit a bearer establishment message to the radio access network equipment, indicate the radio access network equipment to establish a public bearer with the core network equipment, and after the public bearer is established completely, transmit downlink data of machine type communication (MTC) equipment by using the public bearer;

the radio access network is configured to, after finishing initialization, establish the public bearer with the core network equipment after receiving the public bearer establishment transmitted by the core network equipment, and after the public bearer is established completely, transmit uplink data of a plurality of MTC equipments by using the public bearer.

Preferably, the radio access network is further configured to, when the MTC equipment requests to perform an uplink data transmission, judge the data required to be transmitted by the MTC equipment; for the data meeting the predetermined condition, the already established public bearer is used to perform the data transmission; or else, a dedicated data bearer is established to perform the uplink data transmission for that MTC equipment.

Preferably, the core network is further configured to initiate the bearer release when determining that one or more public bearers meet the release condition.

Preferably, the radio access network is further configured to transmit the bearer release request to the core network after determining that one or more public bearers meet the release condition; if the core network determines that the public bearer needs to be released after receiving the bearer release request, then initiate the bearer release.

The system for implementing data transmission in the above mentioned example 3 and example 4 comprises a radio access network and a core network, wherein, the radio access network is configured to, after finishing initialization, transmit a bearer establishment request to the core network equipment, request to establish a public bearer with the core network equipment, and establish the public bearer with the core network equipment after receiving a bearer establishment message transmitted by the core network, and after the public bearer is established completely, transmit uplink data of a plurality of machine type communication (MTC) equipments by using the public bearer; and the core network is configured to, after finishing initialization, transmit the bearer establishment message to the radio access network equipment after receiving the bearer establishment request transmitted by the radio access network equipment, indicate the radio access network equipment to establish the public bearer with the core network equipment, and after the public bearer is established completely, transmit downlink data of the MTC equipment by using the public bearer.

Preferably, the radio access network is further configured to, when the MTC equipment requests to perform an uplink data transmission, judge the data required to be transmitted by the MTC equipment; for the data meeting the predetermined condition, an already established public bearer is used to perform the data transmission; or else, a dedicated data bearer is established to perform the uplink data transmission for that MTC equipment.

Preferably, the core network is further configured to initiate the bearer release when determining that one or more public bearers meet the release condition.

Preferably, the radio access network is further configured to transmit the bearer release request to the core network after determining that one or more public bearers meet the release condition; the core network is configured to initiate the bearer release after determining that the public bearer needs to be released after receiving the bearer release request.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned examples can be implemented with one or more integrated circuits. Accordingly, each module/unit in the above-mentioned examples can be implemented in the form of hardware, or in the form of software function module. The present invention is not limit to any specific form of the combination of the hardware and software.

The above description is only the preferred examples of the present invention and is not intended to limit the present invention. For those skilled in the art, the present invention can have a variety of modifications and variations. All of modifications, equivalents, variations, etc. without departing from the spirit and essence of the present invention should be embodied in the scope of the appending claims of the present invention.

INDUSTRIAL APPLICABILITY

By the method and system described in the present invention, it is not necessary to establish a dedicated data bearer for each data transmission of each MTC equipment; and the user data of all the MTC equipment are transmitted by the public bearer established between the radio access network and the core network. Thus the control plane signaling for bearer control can be reduced, and the efficiency of data transmission is improved.

What we claim is:

1. A method for data transmission in a communication system, comprising:

after a radio access network and a core network have finished initialization, the core network initiating a public bearer establishment or the radio access network requesting to establish the public bearer, and the radio access network and the core network establishing the public bearer there between; and the radio access network and the core network transmitting uplink data and/or downlink data of a plurality of machine type communication (MTC) equipment by using the public bearer;

wherein the step of transmitting uplink data of a plurality of MTC equipment by utilizing the public bearer comprises:

when the MTC equipment requests to perform an uplink data transmission, the radio access network judging whether the uplink data required to be transmitted by the MTC equipment meet a predetermined condition; for the data meeting the predetermined condition, an already established public bearer is used to perform the data transmission; for the data not meeting the predetermined condition, a dedicated data bearer is established to perform the uplink data transmission for the MTC equipment.

2. The method according to claim 1, wherein, the step of the core network initiating a public bearer establishment or the radio access network requesting to establish a public bearer and the radio access network and the core network establishing the public bearer there between comprises:

the radio access network transmitting a bearer establishment request to the core network, the core network, after receiving the bearer establishment request, transmitting a bearer establishment message to the radio access network; or the core network transmitting the bearer establishment message to the radio access network voluntarily; wherein, the bearer establishment message carries a service quality parameter, transport layer information and general packet radio service (GPRS) tunneling protocol tunnel end point identifier (GTP TEID) corresponding to the bearer required to be established; and the radio access network, according to the content carried in the bearer establishment message, establishing the public bearer with the core network.

3. The method according to claim 2, wherein, in the step of the radio access network transmitting the bearer establishment request to the core network, the radio access network transmits the bearer establishment request message to the core network after receiving the uplink data transmitted by the MTC equipment.

4. The method according to claim 2, wherein, the bearer establishment message further carries the number of the bearers required to be established, to indicate establishing a plurality of public bearers.

5. The method according to claim 1, further comprising:

the core network determining that one or more public bearers meet a releasing condition, and initiating the bearer releasing; or the radio access network determining that one or more public bearers satisfy the releasing condition, transmitting a bearer releasing request to the core network, and the core network initiating the bearer releasing after receiving the request and confirming that the public bearer needs to be released.

6. A system for data transmission in a communication system, comprising radio access network equipment and core network equipment, wherein, the core network equipment is configured to, after finishing initialization, transmit a bearer establishment message to the radio access network equipment, indicate the radio access network equipment to establish a public bearer with the core network equipment, and after the public bearer is established completely, transmit downlink data of machine type communication (MTC) equipment by using the public bearer;

the radio access network equipment is configured to, after finishing initialization, establish the public bearer with the core network equipment after receiving the public bearer establishment transmitted by the core network equipment, and after the public bearer is established completely, transmit uplink data of a plurality of MTC equipments by using the public bearer; and the radio access network equipment is further configured to transmit the uplink data of the plurality of MTC equipments by using the public bearer according to the following way: when the MTC equipment requests to perform an uplink data transmission, judging whether the data required to be transmitted by the MTC equipment meet a predetermined condition; for the data meeting the predetermined condition, an already established public bearer is used to perform the data transmission; and for the data not meeting the predetermined condition, a dedicated data bearer is established to perform the uplink data transmission for that MTC equipment.

7. A system for data transmission in a communication system, comprising radio access network equipment and core network equipment, wherein, the radio access network equipment is configured to, after finishing initialization, transmit a bearer establishment request to the core network equipment, request to establish a public bearer with the core network equipment, and establish the public bearer with the core network equipment after receiving a bearer establishment message transmitted by the core network, and after the public bearer is established completely, transmit uplink data of a plurality of machine type communication (MTC) equipments by using the public bearer;

the core network equipment is configured to, after finishing initialization, transmit the bearer establishment message to the radio access network equipment after receiving the bearer establishment request transmitted by the radio access network equipment, indicate the radio access network equipment to establish the public bearer with the core network equipment, and after the public bearer is established completely, transmit downlink data of the MTC equipment by using the public bearer; and the radio access network equipment is further configured to transmit the uplink data of the plurality of MTC equipments by using the public bearer according to the following way: when the MTC equipment requests to perform an uplink data transmission, judging whether the data required to be transmitted by the MTC equipment meet a predetermined condition; for the data meeting the predetermined condition, an already established public bearer is used to perform the data transmission; and for the data not meeting the predetermined condition, a dedicated data bearer is established to perform the uplink data transmission for the MTC equipment.

* * * * *